(12) United States Patent
Colbourne et al.

(10) Patent No.: US 8,699,024 B2
(45) Date of Patent: Apr. 15, 2014

(54) TUNABLE OPTICAL FILTER AND SPECTROMETER

(75) Inventors: Paul Colbourne, Ottawa (CA); Shane H. Woodside, Ottawa (CA); Oleg Bouevitch, Nepean (CA)

(73) Assignee: JDS Uniphase Corporation, Milpitas, CA (US)

( * ) Notice: Subject to any disclaimer, the term of this patent is extended or adjusted under 35 U.S.C. 154(b) by 447 days.

(21) Appl. No.: 13/215,299

(22) Filed: Aug. 23, 2011

(65) Prior Publication Data

US 2013/0050697 A1 Feb. 28, 2013

(51) Int. Cl.
G01J 3/28 (2006.01)

(52) U.S. Cl.
USPC .......................... 356/328; 356/300

(58) Field of Classification Search
USPC .................................. 356/300–334
See application file for complete search history.

(56) References Cited

U.S. PATENT DOCUMENTS

| | | | |
|---|---|---|---|
| 6,097,859 A | 8/2000 | Solgaard et al. | 385/17 |
| 6,791,694 B2 | 9/2004 | Pezeshki | 356/519 |
| 6,891,676 B2 | 5/2005 | Ford et al. | 359/572 |
| 7,130,505 B2 | 10/2006 | Shen | 385/24 |
| 7,362,434 B2 | 4/2008 | Kobayashi | 356/326 |
| 7,424,182 B2 * | 9/2008 | Matsuo et al. | 385/24 |
| 7,440,648 B2 | 10/2008 | Oikawa et al. | 385/16 |
| 7,852,475 B2 | 12/2010 | Crafts et al. | 356/328 |
| 2005/0074204 A1 | 4/2005 | Wilson et al. | 385/24 |
| 2007/0041683 A1 | 2/2007 | Keyworth | 385/24 |
| 2007/0177145 A1 | 8/2007 | Ohishi et al. | 356/328 |
| 2009/0220195 A1 | 9/2009 | Van Der Keur et al. | 385/31 |

FOREIGN PATENT DOCUMENTS

WO 2010033152 3/2010 ............. H04J 14/02

* cited by examiner

*Primary Examiner* — Tara S Pajoohi Gomez
(74) *Attorney, Agent, or Firm* — Teitelbaum & MacLean; Neil Teitelbaum; Doug MacLean

(57) ABSTRACT

A tunable optical filter is disclosed having an input port, a beam translator for translating input and output optical beams, an element having optical power for collimating the translated beam, a reflective wavelength dispersive element, and an output port. The beam translator can include a tiltable MEMS mirror coupled to an angle-to-offset optical element. An output port can be extended into a plurality of egress ports, each receiving a fraction of the scanned optical spectrum. A multi-path scanning optical spectrometer can be used as an optical channel monitor for monitoring performance of a wavelength selective switch, or for other tasks.

25 Claims, 6 Drawing Sheets

TUNABLE OPTICAL FILTER AND SPECTROMETER

TECHNICAL FIELD

The present invention relates to optical filters, and in particular to tunable optical filters having an optical beam scanning element.

BACKGROUND OF THE INVENTION

Tunable optical filters are commonly used in optical devices and systems where an optical spectrum of light needs to be modified, with some wavelengths passing through the filter and some wavelengths blocked by the filter. The wavelengths that are passed by the filter form a band of wavelengths called a transmission band. When the filter is tuned, a central wavelength of the transmission band of the filter is tuned. Tunable optical filters are used in optical communications systems to distinguish between optical signals at different wavelengths carrying different information channels. The optical signals at a single central wavelength are called wavelength channels.

A tunable optical filter is frequently used as a key component of an optical spectrometer. In a scanning optical spectrometer, the central wavelength of a tunable filter is scanned, while the detected optical signal is continuously measured. As a result, an optical spectrum of an optical signal is obtained.

Traditional spectrometers are manufactured as laboratory devices which operate under laboratory environmental conditions. A periodic wavelength and optical power calibration is required to ensure the wavelength and power accuracy of these devices. Traditional spectrometers are generally bulky and costly.

Optical communication systems employing wavelength division multiplexing (WDM) technology achieve large transmission capacity by spacing wavelengths of individual wavelength channels as closely as possible, typically less than a nanometer apart. As the channel spacing decreases, monitoring spectral characteristics of the wavelength channels becomes more important. For example, optical channel monitoring can be used to detect an undesirable wavelength drift of wavelength channels.

Optical communication systems employ optical channel monitors (OCM), which function similarly to laboratory grade spectrometers, but are environmentally robust, inexpensive, and compact in size. The spectral resolution and wavelength accuracy of an OCM must be nearly the same as those of a laboratory grade spectrometer, however without requiring extra calibration over the lifetime of the device.

It is preferable that an OCM is capable not only of monitoring all channels in one optical hand, but also monitoring an optical signal-to-noise ratio (OSNR) for each wavelength channel. Today's WDM networks may employ as many as 100 channels at approximately 0.4 nm spacing. The OSNR measurement calls for 0.2 nm spectral resolution or better, at a dynamic range of 40-50 dB.

OCM are used at wavelength routing network nodes to provide straightforward monitoring and alarm-condition recognition. Furthermore, OCM are used to provide "per-channel" optical power measurement for network control loops. Network control loops are thus limited in their response, at least in part, by the rate at which the OCM can update the optical power measurement.

Typically, a network node contains multiple monitoring locations. If there are N monitoring nodes, one brute force approach would be to deploy N OCM, associating one with each monitoring point. This scales the cost, space and power dissipation associated with the aggregate monitoring function by the same factor N. A more common approach is to deploy an N×1 selector switch at an input of a single OCM, considerably reducing the size and cost associated with multi-point monitoring. However, this approach suffers from poorer response time as the aggregate time to monitor all N points is equal to time=$n$×(switch settling time+OCM scan time)

An OCM is frequently used to control the attenuation of a wavelength selective switch (WSS) in a reconfigurable optical add/drop node. The optical signal is tapped both before and after the WSS, at each port of the WSS, for the purpose of monitoring. Again, the brute force approach could be to use an independent OCM for each of these locations. Given some means to synchronize the scan of these multiple OCM, the channel power of the input and the output could be measured at one time, thereby giving the information required to calculate the attenuation for each measured channel. However, this approach suffers from aforementioned cost and size disadvantages of deploying multiple OCM. As mentioned previously, a more typical application is to implement a selector switch in front of the OCM to reduce size and cost. In this case, in addition to the considerably slower measurement time, the measurement at input and output ports are no longer made at the same time. To the extent that the power levels being measured are not strictly constant over time, there is some confounding imperfect measurement of the inferred WSS attenuation.

One type of industrial-grade OCM acquires all monitored spectral points of an optical spectrum of an input signal in parallel by dispersing the input light in space and using a photodiode array to simultaneously acquire spectral information at a plurality of monitored frequencies. Disadvantageously, the number of photodiodes in the photodiode array scales proportionally to the number of wavelength channels and spectral resolution, thereby increasing the size and cost of the device and reducing its reliability. If the OSNR of each channel is to be measured, several photodetectors have to be provided within the dispersed light of a single channel. Since current photodiode arrays at telecommunications wavelengths of 1.5 to 1.6 micrometers are often supplied in strips of up to 128 photodiodes, this allows monitoring of just over 30 channels. 512 element arrays are available, which is sufficient for monitoring about 100 channels. However, these arrays are expensive.

Another type of industrial-grade OCM acquires the spectrum by angle-tuning a dispersive element, for example a diffraction grating. U.S. Pat. No. 6,118,530 by Bouevitch et al. teaches a scanning frictionless spectrometer with magnetically actuated flexure-supported diffraction grating and a dedicated separate channel for accurate wavelength referencing during each scan. The advantage of a scanning approach is based on the ability to continuously sweep the wavelength, which greatly improves fidelity of spectra obtained, as well as accuracy of signal-to-noise and peak wavelengths measurements. Detrimentally, a scanning spectrometer is often slower than its detector array based counterpart. A slower measurement speed results from the fact that, in a conventional scanning spectrometer, most of incoming light is discarded, and only a narrow optical frequency component is allowed to impinge on a photodetector at any given time.

An intermediate approach, seeking to benefit from the advantages of both a scanning spectrometer and a spectrometer having a photodetector array, has been disclosed by Onishi et al. in US Patent Application Publication 2007/0177145. Referring to FIG. 1, a spectrometer 100 of Onishi et al. is presented in a simplified form. The spectrometer 100 includes an input optical fiber 102, a collimating lens 104, an acousto-optical deflector (AOD) 106 controlled by a controller 107, a diffraction grating 108, a focusing lens 110, photodetectors 112, 113, and 114, analog-to-digital converters (ADC) 115, 116, and 117, a signal processing unit 118, and a display 120. In operation, an input optical signal 101 exits the optical fiber 102 at its tip and is collimated by the collimating lens 104. A collimated optical beam 105 is deviated by the AOD 106 by a controlled variable angle, in dependence on the frequency of a control signal applied by the controller 107 to the AOD 106. The optical beam 105 is dispersed by the diffraction grating 108 into individual wavelengths. The photodetectors 112 to 114 each detect a fraction of a wavelength-dispersed optical beam 111. When the collimated optical beam 105 is angle-tuned by scanning the AOD control signal frequency, the optical spectrum of the wavelength-dispersed optical beam 111 is scanned across the photodetectors 112 to 114. Thus, only a fraction of the optical spectrum needs to be scanned across individual photodetectors 112 to 114. The ADC 115 to 117 digitize the detected signals and provide the digitized signals to the signal processing unit 118. The signal processing unit 118 then combines the individual fragments of the spectrum and displays the spectrum on the display 120.

One disadvantage of the spectrometer 100 is a reduced reliability, limited scanning range, and high cost. Another is large size, which is detrimental in OCM applications. Yet another disadvantage, which is common to all prior-art spectrometers disclosed above, is that it only has a single optical signal path. Thus, when multiple optical signals need to be measured, multiple OCM have to be used, which increases size and cost of the equipment. Alternatively, 1×N optical selector switch could be used as explained above, which considerably slows down the measurements.

The prior art is lacking an optical tunable filter/spectrometer that would be usable for optical channel monitoring applications while being robust, inexpensive, having a high spectral resolution and a large scanning range, while being capable of monitoring multiple optical signals without sacrificing the measuring time. Accordingly, it is a goal of the present invention to provide such a tunable filter/spectrometer.

SUMMARY OF THE INVENTION

A tunable optical filter of the present invention is capable of operating at high precision and a fast speed, while being scalable to multiple input and output port counts. High fidelity of measured spectra is achieved by using scanning of optical beams. Advantageously, both input and output optical beams are synchronously scanned by the same scanner to improve the wavelength scanning range and/or reduce the required scanning distance or scanning angle. The optical configuration of a tunable filter of the present invention allows scalability by providing multiple signal paths. Furthermore, using arrays of egress optical ports allows one to further reduce the required range of mechanical scanning while improving the light collection efficiency, speed of operation, and reliability. Advantageously, multi-row fiber arrays can be used to ease optical alignment and provide a compact multi-path tunable optical filter that can be used for optical channel monitoring (OCM) applications.

In accordance with the invention there is provided a tunable optical filter comprising:
a first input port for providing a first input optical beam;
a beam translator coupled to the first input port, for translating the first input optical beam in a first plane in response to a control signal applied to the beam translator;
an element having optical power, for collimating the translated first optical beam;
a reflective wavelength dispersive unit coupled to the element having optical power, for angularly dispersing the collimated first optical beam in a plane parallel to the first plane, and for reflecting the wavelength-dispersed first optical beam back towards the element having optical power; and
a first output port.

In operation, the reflected dispersed first optical beam is redirected by the element having optical power back towards the beam translator and translated by the beam translator across the first output port, thereby tuning a central wavelength of the tunable optical filter.

To provide a multi-path capability, the tunable optical filter can include a plurality of input ports for providing input optical beams, including the first input port for providing the first input optical beam, and a plurality of corresponding output ports including the first output port, wherein each input-output port pair defines an optical path of the tunable optical filter. In this embodiment, the beam translator is coupled to the plurality of the input ports, for synchronously translating the input optical beams traveling along the individual beam paths. The translation occurs in planes parallel to the first plane, and the element having optical power is adapted for collimating the translated optical beams. The reflective wavelength dispersive unit angularly disperses the translated optical beams in planes parallel to the first plane and reflects the wavelength-dispersed optical beams back towards the element having optical power. The reflected dispersed optical beams are redirected by the element having optical power back towards the beam translator and synchronously translated by the beam translator across the respective output ports of the plurality of the output ports, thereby synchronously tuning central wavelengths of the individual paths of the tunable optical filter.

In accordance with an embodiment of the invention, there is further provided an embodiment of the tunable optical filter having an array of egress ports disposed in a single plane, wherein the first output port is one of the egress ports. During operation of this tunable filter embodiment, the reflected dispersed first optical beam is translated by the beam translator in the plane of the egress ports along a direction of wavelength dispersion of the dispersed first optical beam, so that the dispersed first optical beam is translated across each egress port, thereby tuning the central wavelength of the tunable optical filter at each one of the egress ports, wherein the central wavelengths at different egress ports of the array of the egress ports are shifted with respect to each other. Having a plurality of egress ports instead of a single output port allows the beam translator to scan over a range that is M times smaller than the full scanning range of a scanner having only one output port, wherein M is the number of the egress ports.

In one embodiment, the tunable optical filter can have a plurality of input ports and a plurality of arrays of egress ports, so that each optical path of the N optical paths is now associated with the M egress ports. In other words, each output port, corresponding to a particular input port of the N input ports, is now an egress port of a particular array of N arrays of M egress ports. Thus, the multipath property of the tunable filter can be combined with the increased speed due to reduced scanning range of the beam translator. In this embodiment, the egress ports of each array are disposed in a single plane. In operation, the reflected dispersed optical beams are translated by the beam translator in the corresponding planes of the arrays of the egress ports, so that each dispersed optical beam is translated across each egress port of one of the arrays of the egress ports, thereby tuning the central wavelength at each egress port. The central wavelengths at different egress ports of a same one of the arrays of the egress ports are shifted with respect to each other, while the central wavelengths of the individual optical filter paths are tuned synchronously.

In any of the above described embodiments of the tunable filter, the linear translator preferably includes a tiltable mirror, such a micro-electromechanical (MEMS) mirror, coupled to an angle-to-offset converting element such as a lens. Further, the element having optical power can be made in a form of a single concave mirror, resulting in a very compact yet efficient device. Waveguide arrays can be used for ease of alignment of the multiple input, output, and/or egress ports.

In accordance with another aspect of the invention, there is provided a spectrometer including any of the tunable optical filters described above, one or more photodetectors coupled to the output ports, and a controller that provides the control signal for the linear translator while collecting photodetector signal(s). In embodiments where the egress ports are used for piecewise spectral scanning as described above, the controller also combines these piecewise spectra to obtain the entire spectra of the input optical signals. Waveguide arrays, including multi-row waveguide arrays, can be used for delivery of light to the photodetectors.

BRIEF DESCRIPTION OF THE DRAWINGS

Exemplary embodiments will now be described in conjunction with the drawings in which.

DETAILED DESCRIPTION OF THE INVENTION

Figure 1:
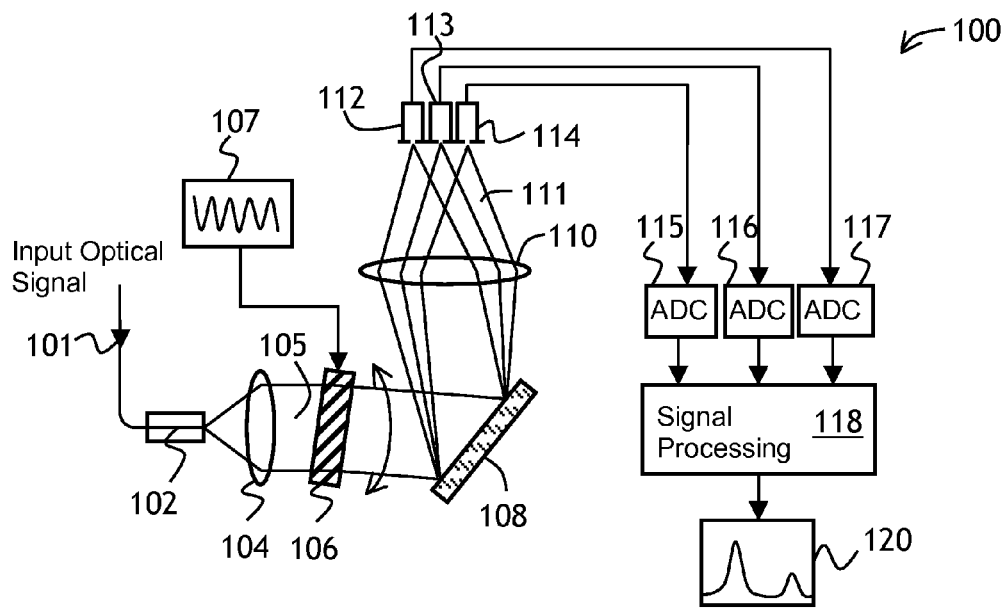
FIG. 1 is a block diagram of a prior-art spectrometer.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 2A, 2B, FIG. 3, FIGS. 4A, 4B, FIG. 5, and FIG. 6A, similar reference numerals denote similar elements.

Figure 2A:
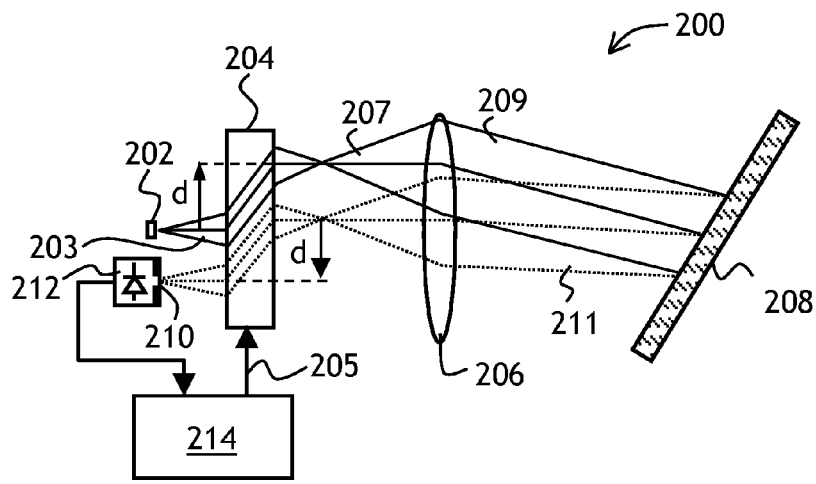
FIG. 2A is a block diagram of a spectrometer according to the present invention.

Referring to FIG. 2A, a spectrometer 200 of the invention includes an input port 202 for providing an input optical beam 203, a beam translator 204 for translating the input optical beam 203 in a plane of FIG. 2A by a controllable distance d, a lens 206 for collimating a translated optical beam 207, a reflective diffraction grating 208 coupled to the lens 206, for angularly dispersing a collimated beam 209 in the plane of FIG. 2A and reflecting a wavelength-dispersed optical beam 211 back towards the lens 206, an output port 210, a photodetector 212, and a controller 214 for providing a control signal 205 for the beam translator 204. The wavelength-dispersed optical beam 211 is translated by the beam translator 204 by the same distance d in an opposite direction to impinge on the output port 210 and be detected by the photodetector 214.

The beam translator 204, schematically illustrated in FIG. 2A, can be based on a movable mirror, a translatable motor-driven platform, etc. Preferably, it includes a tiltable mirror, such as a galvanometer mirror or a MEMS mirror, and an angle to offset element. This preferred implementation of the beam translator will be considered in detail below, when discussing FIG. 4A.

Figure 2B:
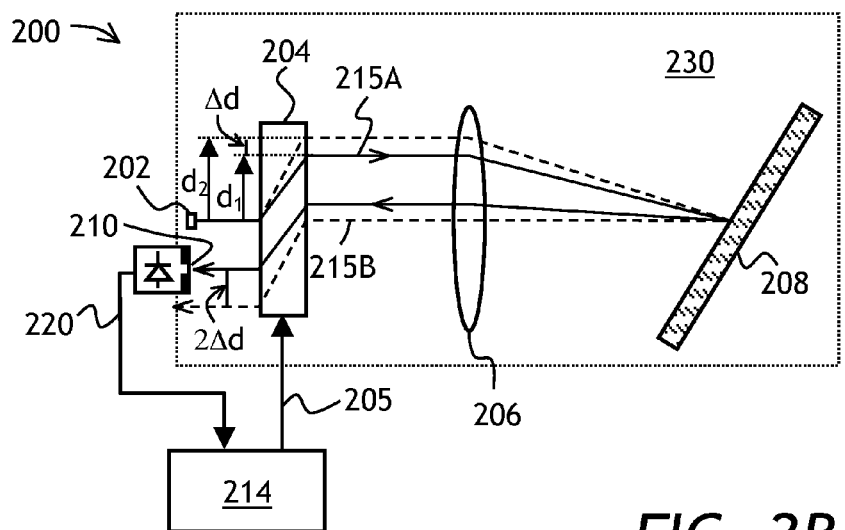
FIG. 2B is a block diagram of the spectrometer of FIG. 2A depicting the chief ray being scanned.

The scanning operation of the spectrometer 200 will now be considered. Referring to FIG. 2B, the spectrometer 200 is redrawn with only central, or so called chief rays 215A, 215B traced through the spectrometer 200, at two magnitudes of beam translation, $d_1$ and $d_2$. The chief rays 215A and 215B are shown in solid and dashed lines, respectively. In FIG. 2B, the chief rays 215A and 215B represent quasi-monochromatic optical beams. The controller 214 generates the control signal 205 for the beam translator 204 to provide the beam translation of $d_1$, at which the chief ray 215A enters the output port 210. Then, the controller 214 detects the photocurrent from the photodetector 212. Then, the controller 214 generates the control signal 205 for the beam translator 204 to provide the beam translation of $d_2$. At the beam translation of $d_2$, the chief ray 215A misses the output port 210. However, a beam at another wavelength, not shown in FIG. 2B, will enter the output port 210 instead of the beam 215B and get detected by the photodetector 212. Then, the controller 214 detects the photocurrent from the photodetector 212 at the beam translation value of $d_2$. In this manner, the entire optical spectrum of the input optical beam 203 can be scanned: the controller 214 applies the control signal 205 to the beam translator 204 for translating the input optical beam 203, while detecting an output electrical signal 220 from the first photodetector 212, so as to obtain the optical spectrum of the input optical beam 203. Notably, the beam translator 204 translates the chief rays 215A and 215B twice, once as they exit the input port 202 and once on their return towards the output ports 210. This allows one to effectively double the value of a shift Δd of the chief rays 215A and 215B at the output port 210, thus reducing an amplitude of beam translation required to scan the entire spectrum of the input light beam 203. The input port 202 and the output port 210 are preferably disposed in a plane forming a non-zero angle with the wavelength dispersion plane, to avoid one of the output optical beams accidentally striking the input port 202.

The optical spectrometer 200 is essentially based on a tunable optical filter 230 schematically shown by a dotted rectangle in FIG. 2B. The tunable optical filter 230 includes the input port 202, the beam translator 204, the lens 206, and the diffraction grating 208.

Figure 3:
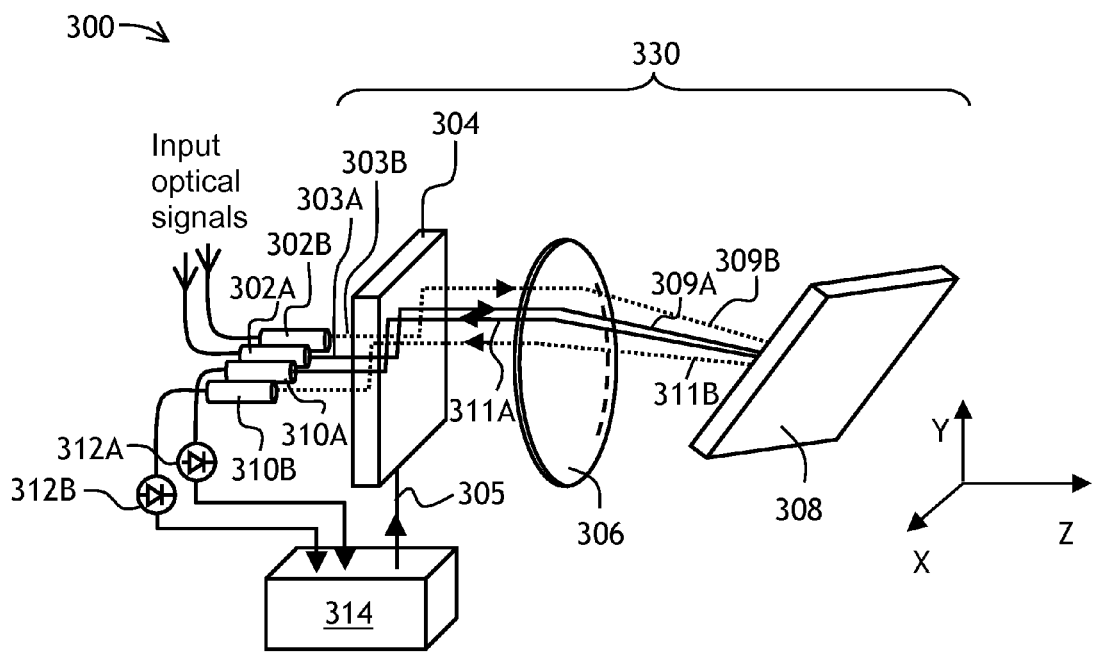
FIG. 3 is a perspective block diagram of a spectrometer of FIGS. 2A and 2B equipped with a plurality of input and output ports to form a multi-path spectrometer.

Turning now to FIG. 3, a multi-path optical spectrometer 300 is shown. The multi-path optical spectrometer 300 is similar to the optical spectrometer 200, which is a single-path spectrometer. The multi-path optical spectrometer 300 is configured to accommodate multiple optical paths therein, enabling simultaneous spectral measurements of a plurality of optical signals, each signal propagating on its own path within the multi-path optical spectrometer 300. The multi-path optical spectrometer 300 includes a multi-path tunable optical filter 330, photodetectors 312A and 312B, and a controller 314. The multi-path tunable optical filter includes input ports 302A, 302B, and output ports 310A, 310B, defining two independent optical paths within the multi-path tunable optical filter 330. The rest of the construction of the multi-path tunable optical filter 330 is analogous to that of the single-path tunable optical filter 230. The multi-path tunable optical filter 330 includes a beam translator 304, a lens 306, and a diffraction grating 308. The beam translator 304 is coupled to both input ports 302A and 302B for synchronously translating input optical beams 303A, 303B traveling along the corresponding optical paths. The lens 306 collimates both optical beams 303A and 303B. The diffraction grating 308 angularly disperses collimated optical beams 309A and 309B in planes parallel to the YZ plane, reflecting wavelength-dispersed optical beams 311A and 311B back towards the lens 306. The reflected wavelength-dispersed optical beams 311A and 311B are redirected by the lens 306 back towards the beam translator 304. The beam translator 304 synchronously translates the wavelength-dispersed optical beams 311A and 311B across the respective output ports 310A and 310B in dependence on the control signal 305 from the controller 314. As a result, central wavelengths of the individual paths of the spectrometer 300 are tuned synchronously. Of course, the number of input ports, output ports, and/or photodetectors can be bigger than the two shown. When the number of photodetectors is sufficiently large, waveguide arrays and/or photodetector arrays can be used.

In the tunable optical filters 230 and 330, the lenses 206 and 306, respectively, can be substituted for another optical element having optical power (that is, the magnifying power). For example, a concave mirror can be used in place of the lens 206 or 306. Similarly, the diffraction gratings 208 and 308 can be substituted for any reflective light-dispersing element or a module. For example, a transmission diffraction grating, coupled with a reflector, can be used in place of the diffraction grating 208 or 308, which effectively doubles the dispersion of the transmission diffraction grating. The beam translators 204 and 304 preferably include a tillable mirror coupled to a lens. These components are in fact used in an embodiment of a tunable optical filter described below.

Figure 4A:
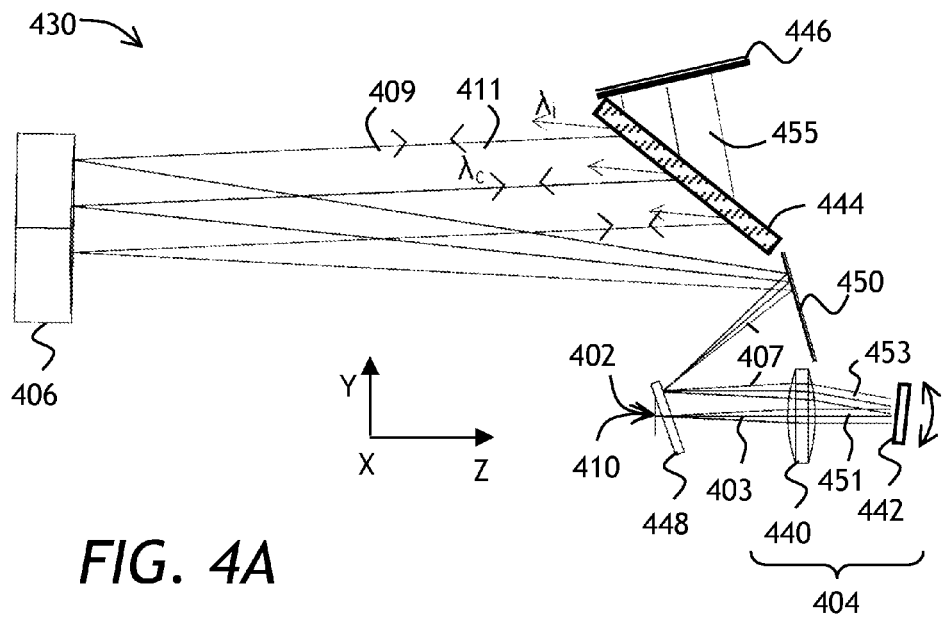
FIG. 4A is an optical layout of an embodiment of a tunable optical filter for use in the spectrometers of FIGS. 2A, 2B, and FIG. 3.

Referring to FIG. 4A, a tunable filter 430 is similar to the tunable filter 330 of FIG. 3. The tunable filter 430 includes a lens 440, a tiltable MEMS mirror 442, a concave mirror 406, a transmission diffraction grating 444, a reflector 446, and folding mirrors 448 and 450. Input and output ports 402 and 410 are disposed in XZ plane and appear one under the other in the plane of FIG. 4A (YZ plane). The lens 440 operates as an angle-to-offset element. Together with the tiltable MEMS mirror 442 it forms a beam translator 404 corresponding to the beam translator 204 of FIGS. 2A, 2B, and the beam translator 304 FIG. 3. In operation, a diverging input light beam 403 is collimated by the lens 440 to form a collimated beam 451 impinging on the MEMS mirror 442. The MEMS mirror 442, when tilted, steers a collimated reflected beam 453, directing it back to the lens 440. The lens 440 transforms the angle of the collimated reflected beam 453 into an offset of the refocused beam 407 which is redirected by the folding mirrors 448 and 450 towards the concave mirror 406. The concave mirror 406 collimates the offset beam 407 to form a collimated beam 409 impinging on the transmission diffraction grating 444. The transmission diffraction grating 444 angularly spreads the collimated beam 409 and into beams at individual wavelengths in the YZ plane. Only one such beam 455 at a center wavelength $\lambda_C$ is shown in FIG. 4A. The beam 455 is reflected back by the reflector 446 and is diffracted by the diffraction grating 444 to propagate back through the tunable filter 430 as a returning light beam 411, which retraces back towards the output port 410. For each specific angle of the tiltable MEMS mirror 442, only a narrow range of wavelengths about a specific wavelength denoted $\lambda_C$ follow the counter-propagating path so as to couple to the output port 410, which is symmetrically located about an optical axis of the concave mirror 406 relative to the corresponding input port 402. Other wavelengths, for example those denoted as $\lambda_i$ (the full path not shown for visual clarity) are reflected at other angles and thus do not return to the output port 410. Adjusting the angle of the tiltable MEMS mirror 442 changes the incident angle to the diffraction grating 444 and thus it changes the value of the central wavelength $\lambda_C$ of the returning light beam 411, which couples to the output port 410.

The tunable optical filter 430 of FIG. 4 can be a multi-path filter where the same set of optics are used to provide a plurality of synchronously tunable optical filters. Each of these synchronously tunable filters has a separate optical path within the tunable filter 430. Each optical path is associated with a particular input port and an output port.

Figure 4B:
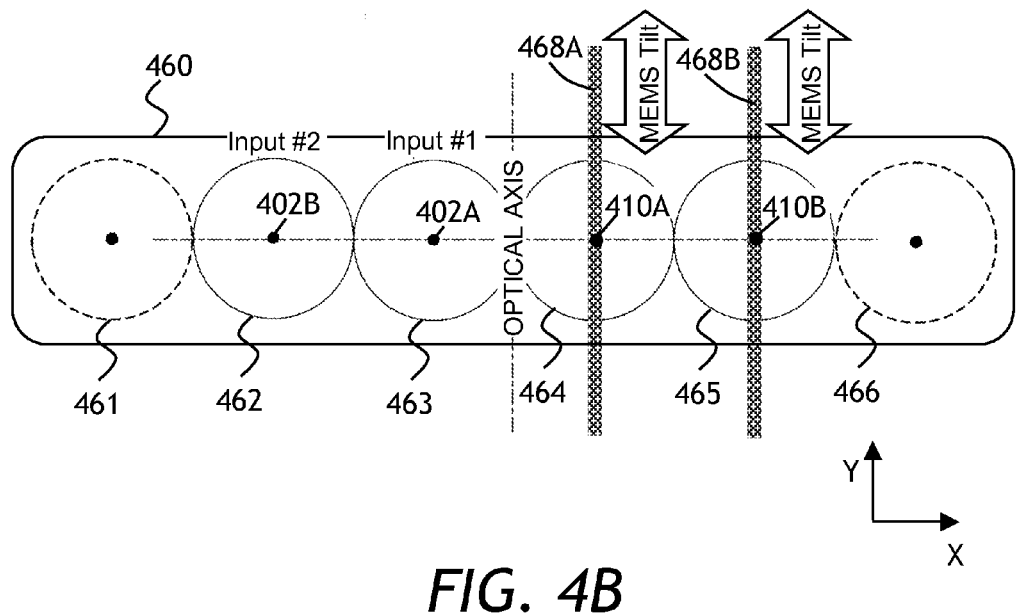
FIG. 4B is a frontal view of a fiber array used to input light to, and to output light from the tunable optical filter of FIG. 4A.

A fiber array can be used to provide light input and output to the tunable optical filter 430. Referring now to FIG. 4B, a fiber array 460 including fibers 461 to 466 is shown in a frontal view. A tip 402A of the third fiber from the left (463) is an input port, and a tip 410A of the fourth fiber from the left (464) is an output port of the tunable optical filter 430. Together, these define an optical path within the tunable optical filter 430. During scanning of the tiltable MEMS mirror 442, a wavelength-dispersed focal spot 468A is translated across the fiber tip 410A in a direction indicated by a "MEMS Tilt" arrow (that is, along Y axis). Similarly, a tip 402B of the second fiber from the left (462) is another input port, and a tip 410B of the fifth fiber from the left (465) is another output port of the tunable optical filter 430, defining another optical path within the tunable optical filter 430. During scanning of the tillable MEMS mirror 442, a wavelength-dispersed focal spot 468B is translated across the output port 410B as shown by the "MEMS Tilt" arrow. The wavelength-dispersed focal spots 468A and 468B are scanned synchronously because the same tiltable MEMS mirror 442 is used for scanning. A third pair of fibers shown in dashed lines, specifically the first fiber 461 and the last fiber 466, can be used to make a third optical path of the tunable optical filter 430. The total number of available optical paths in the tunable optical filter 430 is limited by the number of fibers in the fiber array 460 that can be used without introducing too large off-axis optical aberrations.

Separate fiber arrays can be used for the input fibers 461-463 and the output fibers 464-466. Furthermore, planar waveguide arrays can be used instead of fiber arrays. The fibers or waveguides can be concentrated to reduce the fiber/waveguide pitch, so as to accommodate more input and output ports. A microlens array can be placed in front of the fiber or waveguide array to create input beams with larger waist size, which serves to reduce the ratio of fiber/waveguide pitch to beam waist size, this also allows more input and output ports to be accommodated. To make sure that the dispersed focal spots do not overlap, the input and the output ports 402 and 410 can be disposed in a plane forming an angle with the plane with the plane of dispersion (YZ plane in FIG. 4A). For example, this angle is 90 degrees in FIG. 4B, placing the input and output ports parallel to the XZ plane, but could be another non-zero angle such as 60 degrees in which case the input and output ports are not parallel to the XZ plane. It is to be understood, however, that the fibers or waveguides are optional, and the tunable optical filter 430, as well as the tunable optical filters 330 and 230, can be free space coupled using corresponding input and output ports 402A, B and 410A, B, respectively. As an example, photodetectors could be placed directly at the locations 410A and 410B instead of using optical fibers to transmit the signals to external photodetectors.

Figure 5:
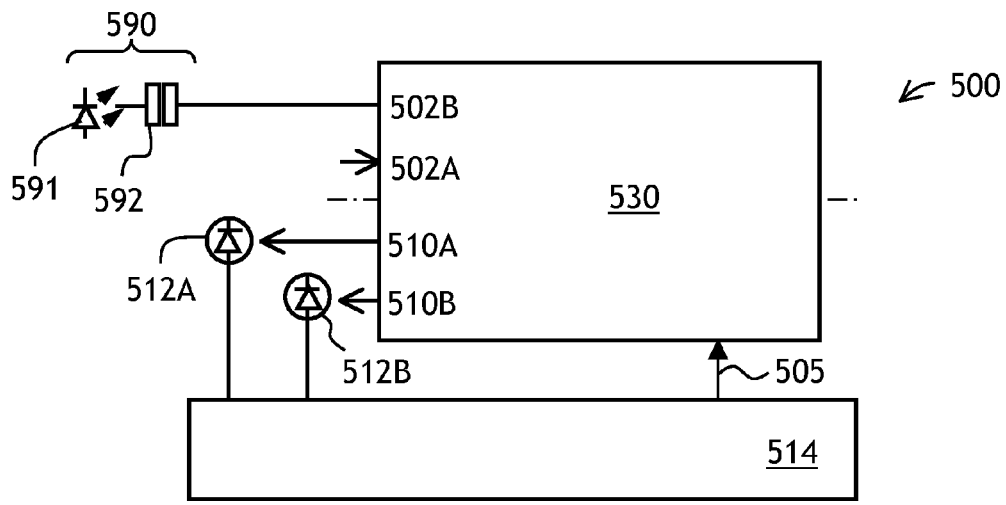
FIG. 5 is a block diagram of a spectrometer equipped with a reference channel.

One of the optical paths of the tunable optical filter 430 can be used for providing a wavelength reference signal. Referring to FIG. 5, a spectrometer 500 includes a multi-path tunable optical filter 530, photodetectors 512A and 512B, a reference light source 590 including a LED 591 and a Fabry Perot etalon 592, and a controller 514. The multi-path tunable optical filter 530 is similar to the multi-path tunable filters 430, 330, and 230 of FIGS. 4A, FIG. 3, and FIG. 2B, respectively. The multi-path tunable optical filter 530 has two input ports 502A and 502B and two output ports 510A and 510B, defining two paths within the tunable optical filter 530. In operation, the controller 514 generates a control signal 505 for tuning the central wavelength $\lambda_C$ of the tunable optical filter 530, while detecting photocurrents of the photodetectors 512 and 512B representative of optical signals in the two paths. The reference light source 590 provides a spectrum having peaks and/or valleys at known wavelengths, to provide wavelength reference points during scanning of the central wavelength $\lambda_C$. A fiber Bragg grating, a gas cell, or any other element with known attenuation spectrum can be used in place of the Fabry Perot etalon 592. The reference light source could also comprise a laser or multiple lasers, or a gas discharge lamp emitting known wavelengths.

Figure 6A:
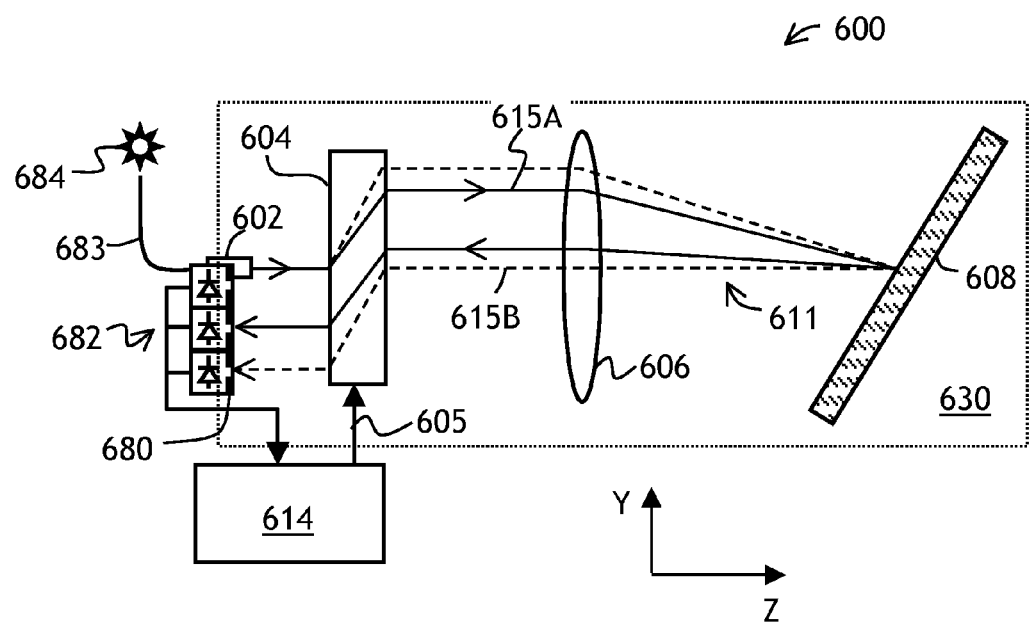
FIG. 6A is a block diagram of a tunable optical filter and a spectrometer having an array of egress ports.

Turning now to FIG. 6A, a spectrometer 600 is similar to the spectrometers 200, 300, and 500 of FIGS. 2, 3, and 5, respectively. The spectrometer 600 includes a tunable optical filter 630, a controller 614, and an array of photodetectors 682. The tunable optical filter 630 includes an input port 602, a beam translator 604, a lens 606, and a diffraction grating 608. The tunable optical filter 630 operates similarly to the previously described tunable filters 230, 330, and 430. The distinctive feature of the tunable filter 630 is that in place of a single output port per single input port, there are plural output ports per single input port. To distinguish these plural output ports from the output ports of the tunable filters 330 and 430 described above, the output ports of the tunable optical filter 630 of FIG. 6 are called herein "egress ports". Specifically, the tunable optical filter 630 has not just one output port, but an array of egress ports 680, which are disposed in YZ plane. In operation, a reflected dispersed first optical beam 611 is translated by the beam translator 604 in YZ plane across the egress ports 680, so that a wavelength-dispersed focal spot (not shown in FIG. 6A) is translated across each egress port of the array of egress ports 680, thereby tuning the central wavelength $\lambda_C$ of the tunable optical filter 630 at each one of the egress ports 680. The translation of the wavelength-dispersed optical beam 611 is illustrated in FIG. 6A by means of two chief rays, 615A and 615B, shown in solid and dashed lines, respectively, corresponding to two different magnitudes of beam translation. Since individual egress ports of the array 680 are shifted relative to each other, central wavelengths $\lambda_{CE}$ at different egress ports of the array 680 are shifted with respect to each other as well.

The controller 614 is configured for applying a control signal 605 to the beam translator 604 for translating the input optical beam 615A, while detecting output electrical signals 620 from each photodetector of the array 682, so as to obtain partial optical spectra of an input optical signal 683 from a light source 684. Once the partial optical spectra are obtained, the optical spectrum of the input optical signal 683 can be calculated by combining the obtained partial optical spectra, as described below.

Figure 6B:
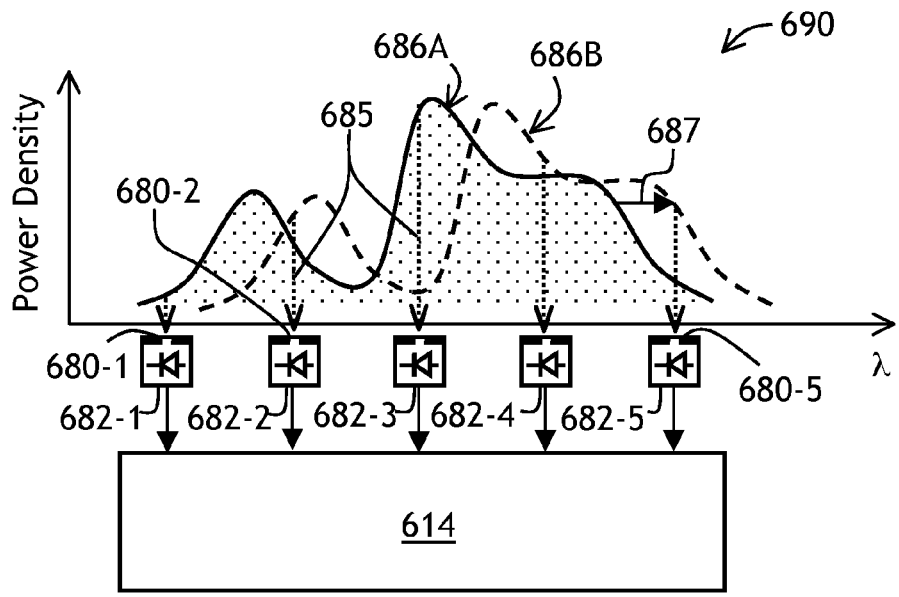
FIG. 6B is a diagram illustrating a principle of operation of the spectrometer of FIG. 6A.

Referring to FIG. 6B, the process of obtaining partial optical spectra is illustrated by means of a diagram 690 showing the spectrum of the light source 684 of FIG. 6A at two positions denoted as 686A and 686B. These two positions correspond to two positions of the chief rays 615A and 615B, respectively, shown in FIG. 6A. Still referring to FIG. 6B, photodetectors 682-1, 682-2, . . . 682-5 of the photodetector array 682 detect optical signals at central wavelengths $\lambda_{CE}$ at corresponding egress ports 680-1, 680-2, . . . 680-5. As the wavelength-dispersed optical beam 611 shifts from the position of the chief ray 615A to the position of the chief ray 615B, the spectrum shifts from the position 686A to 686B, as indicated by an arrow 687. As the spectrum shifts, the signals from the photodetectors 682-1, 682-2, . . . 682-5 of the photodetector array 682 are detected by the controller 614, so as to obtain partial optical spectra. The whole optical spectrum of the light source 684 is obtained by combining the partial optical spectra in the controller 614. The presence of egress ports 680 allows one to speed up the scanning because the scanning of the entire optical spectrum across a single output port is no longer required. The efficiency of light collection also improves because less light is discarded during scanning, which improves signal-to-noise ratio of the scanned spectrum. The translation range of the beam translator 604 is reduced, which in the case of a MEMS mirror reduces the angular tilt range required of the MEMS mirror.

The multi-path tunable optical filters 330, 430, and 530 can also be configured to have an array of egress ports per each input port, similarly to the tunable optical filter 630 described above. The tunable optical filters 330, 430, and 530 would then have a plurality of arrays of egress ports, egress ports of each array being disposed in a single plane. In this case, each input port of the plurality of output ports is associated with an array of egress ports, not just one output port. A plurality of arrays of photodetectors will then be required, each array corresponding to an array of the plurality of the arrays of the egress ports. Within each array, one of the photodetectors will need to be coupled to a particular egress port of a corresponding one of the arrays of the egress ports. Each one of the input ports, a corresponding array of the plurality of the arrays of egress ports, and a corresponding array of the plurality of the arrays of the photodetectors together define an optical path of the multipath spectrometers optical filters 330, 430, and 530.

During operation of the multi-path, multiple egress ports variants of the spectrometers 300, 500, and 600, the reflected dispersed optical beams are translated by the corresponding beam translators 304, 504, and 604 in the planes of the arrays of the egress ports, so that each dispersed optical beam is translated across each egress port of one of the arrays of the egress ports, thereby tuning the central wavelength at each egress port. The central wavelengths at different egress ports of a same one of the arrays of the egress ports are shifted with respect to each other, while the central wavelengths of the individual optical paths are tuned synchronously. The controllers 314, 514, or 614 would need to be configured for applying the control signal to the beam translator 304, 504, and 604, respectively, for translating the input optical beams, while detecting the output electrical signals from each photodetector, so as to obtain partial optical spectra for each of the input optical beams, and to obtain the optical spectrum of each of the input optical beams by combining the corresponding partial optical spectra, in a similar manner as in the spectrometer 600 described above.

Figure 7:
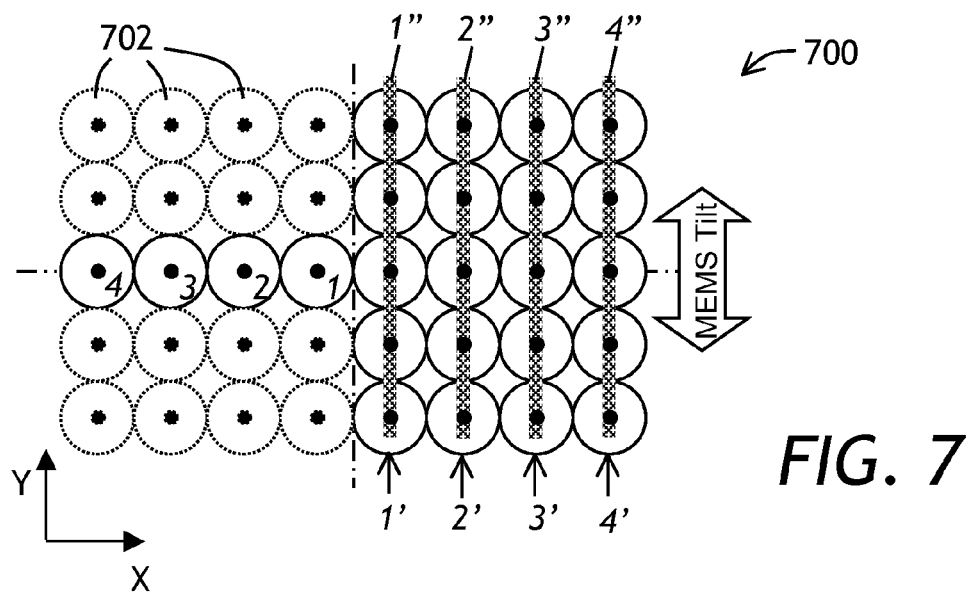
FIG. 7 is a frontal view of a multi-row fiber array usable in the spectrometer of FIG. 3, the tunable filter of FIG. 4A, and the spectrometers of FIG. 5 and FIG. 6A.

A multi-row fiber array can be used to provide all the required ports in multi-path, multiple egress ports variants of the tunable optical filters 330, 430, 530, and 630 in a single array. Referring now to FIG. 7, a multi-row array 700 is presented. For each input fiber 1, 2, 3, 4, there is a corresponding vertical row of egress fibers 1', 2', 3', 4'. Along each of these rows, a wavelength-dispersed focal spot 1", 2", 3", 4" is translated during tuning of the corresponding tunable filter. For example, when the multi-row fiber array 700 is used in the tunable optical filter 430 of FIG. 4A, the wavelength-dispersed focal spots 1", 2", 3", 4" are translated upon tilting of the MEMS mirror 442 in a direction indicated by the "MEMS Tilt" arrow in FIG. 7. Other fibers 702 of the multi-row fiber array 700, drawn in dotted line, could be used to provide additional optical inputs, for example, for a scanning range having different start and end wavelengths for the optical spectra of the input optical beams 303A and 303B of the scanning spectrometer 300.

In general, the multi-row fiber array 700 can have M rows of arrays each having 2N fibers, wherein M is the number of egress ports, and N is the number of input ports. Alternatively, a 1×N array can be used for the input ports, and a M×N multi-row array can be used for the egress ports. Photodetector arrays, one coupled to each egress port by the M×N multi-row array, can be used to save space and simplify the assembly. As in case of the single-row fiber array 460 of FIG. 4B, the number of usable fibers in the multi-row fiber array 700 is limited by optical aberrations in the optics of the tunable optical filters 330, 430, 530, and 630. A multi-row waveguide array may be used in place of the multi-row fiber array 700.

Figure 8:
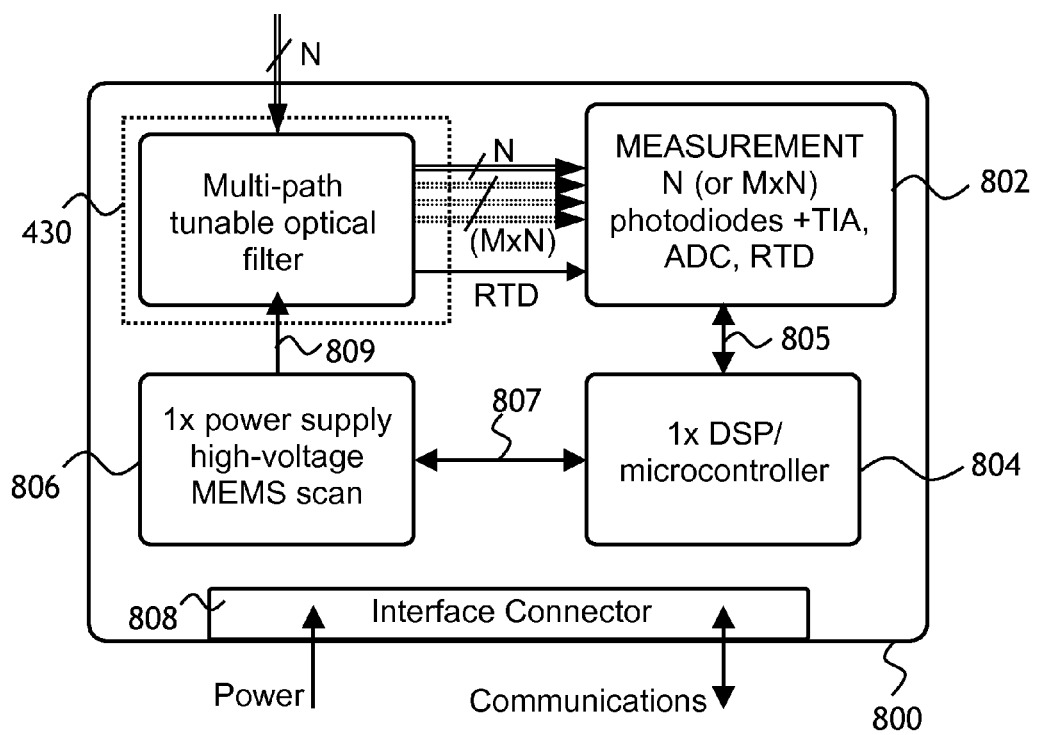
FIG. 8 is a functional block diagram of a multi-path spectrometer based on the multi-path tunable optical filter of FIG. 4A and/or FIG. 6A.

Turning to FIG. 8, a multi-path spectrometer 800 includes an embodiment of the multi-path tunable optical filter 430 having N input ports, a measurement unit 802, a microcontroller 804, a high-voltage MEMS driver 806, and an interface connector 808. In one embodiment, the multi-path tunable optical filter has N output optical fibers; in another, it has M×N output optical fibers, that is, M egress-port output fibers for each of the N input fibers. Accordingly, the measurement unit 802 includes N or M×N photodiodes, N or M×N corresponding trans-impedance amplifiers (TIA), and N or M×N analog-to-digital converters (ADC), as the case may be. The measurement unit 802 also has RTD electronics for optional temperature compensation.

The measurement data are received by the microcontroller 804 through a bus 805 as it controls the scanning voltage generated by the MEMS driver 806, for scanning the central wavelength $\lambda_C$ of the tunable optical filter 430. The scanning is controlled through a control line 807. The high voltage for tilting the MEMS mirror 442 is supplied through a high-voltage line 809.

The multi-path optical spectrometers 300, 500, 600, and 800 can be used for multi-point optical channel monitoring in an optical network. They can be used to monitor optical signals at an input and an output, or outputs of a wavelength selective switch. Since all the spectra are obtained essentially simultaneously as explained above, the fidelity of the measurements of the performance of the wavelength selective switch is improved.

Various embodiments of spectrometers have been considered above. These spectrometers are all based on tunable filters disclosed above. It is to be understood that these tunable filters can also be used in other applications, including signal filtering, adding or dropping wavelength channels in an optical networks, and other applications.

The foregoing description is not intended to be exhaustive or to limit the invention to the precise form disclosed. Many permutations, modifications, and variations are possible in light of the above teaching. It is intended that the scope of the invention be limited not by this detailed description, but rather by the claims appended hereto.

What is claimed is:

1. A tunable optical filter comprising:
    a first input port for providing a first input optical beam;
    a beam translator coupled to the first input port, for translating the first input optical beam in a first plane;
    an element having optical power, for collimating the translated first optical beam;
    a reflective wavelength dispersive unit coupled to the element having optical power, for angularly dispersing the collimated first optical beam in a plane parallel to the first plane, and for reflecting the wavelength-dispersed first optical beam back towards the element having optical power; and
    a first output port for outputting at least a portion of the wavelength dispersed first optical beam;
    wherein in operation, the reflected dispersed first optical beam is redirected by the element having optical power back towards the beam translator and translated by the beam translator across the first output port, thereby tuning a central wavelength of the tunable optical filter.

2. The tunable optical filter of claim 1, wherein the beam translator comprises a controller for generating a control signal; and a mirror tiltable in response to the control signal applied thereto, optically coupled to an angle-to-offset converting element.

3. The tunable optical filter of claim 2, wherein the tiltable mirror comprises a MEMS mirror.

4. The tunable optical filter of claim 1, wherein the first input port and the first output port are disposed in a second plane forming a non-zero angle with the first plane.

5. The tunable optical filter of claim 4, further comprising a plurality of input ports for providing input optical beams, including the first input port for providing the first input optical beam, and a plurality of corresponding output ports including the first output port, wherein each input-output port pair defines an optical path,
    wherein the beam translator is optically coupled to the plurality of the input ports, for synchronously translating the input optical beams traveling along the corresponding optical paths, wherein the input optical beams include the first input optical beam, wherein the translation occurs in planes parallel to the first plane;
    wherein the element having optical power is for collimating the translated optical beams;
    wherein the reflective wavelength dispersive unit is for angularly dispersing the collimated optical beams in planes parallel to the first plane, and for reflecting the wavelength-dispersed optical beams back towards the element having optical power; and
    wherein in operation, the reflected dispersed optical beams are redirected by the element having optical power back towards the beam translator and synchronously translated by the beam translator across the respective output ports of the plurality of the output ports, thereby synchronously tuning central wavelengths of the individual paths of the tunable optical filter.

6. The tunable optical filter of claim 1, further comprising an array of egress ports disposed in a single plane, wherein the first output port is one of the egress ports, wherein in operation, the reflected dispersed first optical beam is translated by the beam translator in the plane of the egress ports along a direction of wavelength dispersion of the dispersed first optical beam, so that the dispersed first optical beam is translated across each egress port, thereby tuning the central wavelength of the tunable optical filter at each one of the egress ports, wherein the central wavelengths at different egress ports of the array of the egress ports are shifted with respect to each other.

7. The tunable optical filter of claim 5, further comprising a plurality of arrays of egress ports, wherein egress ports of each array are disposed in a single plane, wherein each output port of the plurality of output ports is an egress port of a particular array of the plurality of the arrays of the egress ports, and
wherein in operation, the reflected dispersed optical beams are translated by the beam translator in the corresponding planes of the arrays of the egress ports, so that each dispersed optical beam is translated across each egress port of one of the arrays of the egress ports, thereby tuning the central wavelength at each egress port, wherein the central wavelengths at different egress ports of a same one of the arrays of the egress ports are shifted with respect to each other, while the central wavelengths of the individual optical filter paths are tuned synchronously.

8. The tunable optical filter of claim 5, further comprising input and output waveguide arrays, wherein the input and the output ports of the pluralities of the input and the output ports are tips of waveguides of the input and the output waveguide arrays, respectively.

9. The tunable optical filter of claim 8, wherein the input and the output waveguides array form a single waveguide array disposed perpendicular to the first plane.

10. The tunable optical filter of claim 1, wherein the reflective wavelength dispersive unit comprises a transmission diffraction grating coupled to a reflector, and wherein the element having optical power comprises a concave mirror.

11. A spectrometer comprising:
the tunable optical filter of claim 1;
a first photodetector coupled to the first output port, for providing an output electrical signal in response to light impinging thereon; and
a controller for applying a control signal to the beam translator for translating the first input optical beam, while detecting the output electrical signal from the first photodetector, so as to obtain the optical spectrum of the first input optical beam.

12. The spectrometer of claim 11, wherein the beam translator comprises a mirror tiltable in response to the control signal applied thereto, coupled to an angle-to-offset converting element.

13. The spectrometer of claim 12, wherein the tiltable mirror is a MEMS mirror.

14. The spectrometer of claim 11, wherein the first input port and the first output port are disposed in a second plane forming a non-zero angle with the first plane.

15. The spectrometer of claim 14, further comprising:
a plurality of input ports for providing input optical beams, including the first input port for providing the first input optical beam;
a plurality of output ports including the first output port, each of the output ports corresponding to an input port of the plurality of the input ports; and
a first array of photodetectors each coupled to one of the plurality of the output ports, for providing output electrical signals in response to light impinging thereon, wherein each input-output port pair and a corresponding photodetector defines a single optical path of the spectrometer;
wherein the beam translator is coupled to the plurality of the input ports, for synchronously translating the input optical beams traveling along the corresponding optical paths, wherein the input optical beams include the first input optical beam, wherein the translation occurs in planes parallel to the first plane;
wherein the element having optical power is for collimating the translated optical beams;
wherein the reflective wavelength dispersive unit is for angularly dispersing the collimated optical beams in planes parallel to the first plane, and for reflecting the wavelength-dispersed optical beams back towards the element having optical power; and
wherein in operation, the reflected dispersed optical beams are redirected by the element having optical power back towards the beam translator and synchronously translated by the beam translator across the respective output ports of the plurality of the output ports, thereby synchronously tuning central wavelengths of the individual optical paths; and wherein the controller is configured for applying the control signal to the beam translator while detecting electrical signals form each of the first array of the photodetectors, thereby obtaining optical spectra of the input optical beams.

16. The spectrometer of claim 11, further comprising an array of egress ports disposed in a single plane, wherein the first output port is one of the egress ports, and an array of photodetectors, wherein the first photodetector is a photodetector of the array of the photodetectors, wherein each photodetector is coupled to a particular egress port of the array of the egress ports;
wherein in operation, the reflected dispersed first optical beam is translated by the beam translator in the plane of the array of the egress ports along a direction of wavelength dispersion of the dispersed first optical beam, so that the dispersed first optical beam is translated across each egress port of the first array, thereby tuning the central wavelength of the tunable optical filter at each egress port, wherein the central wavelengths at different egress ports of the first array are shifted with respect to each other,
wherein the controller is configured for applying the control signal to the beam translator while detecting the output electrical signals from each photodetector of the array of the photodetectors, so as to obtain partial optical spectra, and to obtain the optical spectrum of the input optical beam by combining the partial optical spectra.

17. The spectrometer of claim 15, further comprising:
a plurality of arrays of egress ports, wherein egress ports of each array are disposed in a single plane, wherein each output port of the plurality of output ports is an egress port of a particular array of the plurality of the arrays of the egress ports; and
a plurality of arrays of photodetectors for providing output electrical signals in response to light impinging thereon, including the first array of the photodetectors, wherein each array of the plurality of the arrays of the photodetectors corresponds to an array of the plurality of the arrays of the egress ports, wherein within each array, one of the photodetectors is coupled to a particular egress port of a corresponding one of the arrays of the egress ports;

wherein each one of the input ports, a corresponding array of the plurality of the arrays of egress ports, and a corresponding array of the plurality of the arrays of the photodetectors together define an optical path of the spectrometer;

wherein in operation, the reflected dispersed optical beams are translated by the beam translator in the corresponding planes of the arrays of the egress ports, so that each dispersed optical beam is translated across each egress port of one of the arrays of the egress ports, thereby tuning the central wavelength at each egress port, wherein the central wavelengths at different egress ports of a same one of the arrays of the egress ports are shifted with respect to each other, while the central wavelengths of the individual optical paths are tuned synchronously; and wherein the controller is configured for applying the control signal to the beam translator while detecting the output electrical signals from each photodetector, so as to obtain partial optical spectra for each of the input optical beams, and to obtain the optical spectrum of each of the input optical beams by combining the corresponding partial optical spectra.

18. The spectrometer of claim 15, further comprising input and output waveguide arrays, wherein the input and the output ports of the pluralities of the input and the output ports are tips of the waveguides of the input and the output waveguide arrays, respectively, and wherein each waveguide of the output waveguide array couples a particular one of the plurality of the output ports to a particular one of the first array of photodetectors.

19. The spectrometer of claim 18, wherein the input and the output waveguides array form a single waveguide array disposed perpendicular to the first plane.

20. The spectrometer of claim 16, further comprising an output waveguide array, wherein the egress ports of the array of the egress ports are tips of the waveguides of the output waveguide array, and wherein each waveguide of the output waveguide array couples a particular egress port of the array of the egress ports to a particular photodetector of the array of the photodetectors.

21. The spectrometer of claim 17, further comprising input and output waveguide arrays,
wherein the input ports are tips of waveguides of the input waveguide array; and
wherein the egress ports are tips of waveguides of the output waveguide array, wherein the output waveguide array is a first multi-row waveguide array, each row of the first multi-row waveguide array corresponding to an array of the plurality of the arrays of the egress ports, and wherein each waveguide of the output waveguide array couples a particular one of the array of the egress ports to a corresponding photodetector of the plurality of the arrays of photodetectors.

22. The spectrometer of claim 21, wherein the input and the output waveguide arrays form a second multi-row waveguide array, wherein the second multi-row waveguide array includes input waveguides for providing additional input optical ports, each such additional input optical port associated with a first array of the plurality of arrays of egress ports, for providing different start and end wavelengths of the optical spectrum of the input optical beam corresponding to the first array of the egress ports.

23. The spectrometer of claim 11, wherein the reflective wavelength dispersive unit comprises a transmission diffraction grating coupled to a reflector, and wherein the element having optical power comprises a concave mirror.

24. The spectrometer of claim 15, further comprising a reference light source coupled to the first input port,
wherein the controller is adapted for processing the output electrical signal from the photodetector coupled to the first output port, so as to obtain a reference wavelength of the reference light source.

25. The spectrometer of claim 24, wherein the reference light source comprises a wavelength reference element selected from the group consisting of a laser, a Fabry Perot etalon, a fiber Bragg grating, and a gas cell.

* * * * *